Oct. 19, 1937. G. LUNDQUIST 2,096,120
MEAT TENDERER
Filed Feb. 26, 1934
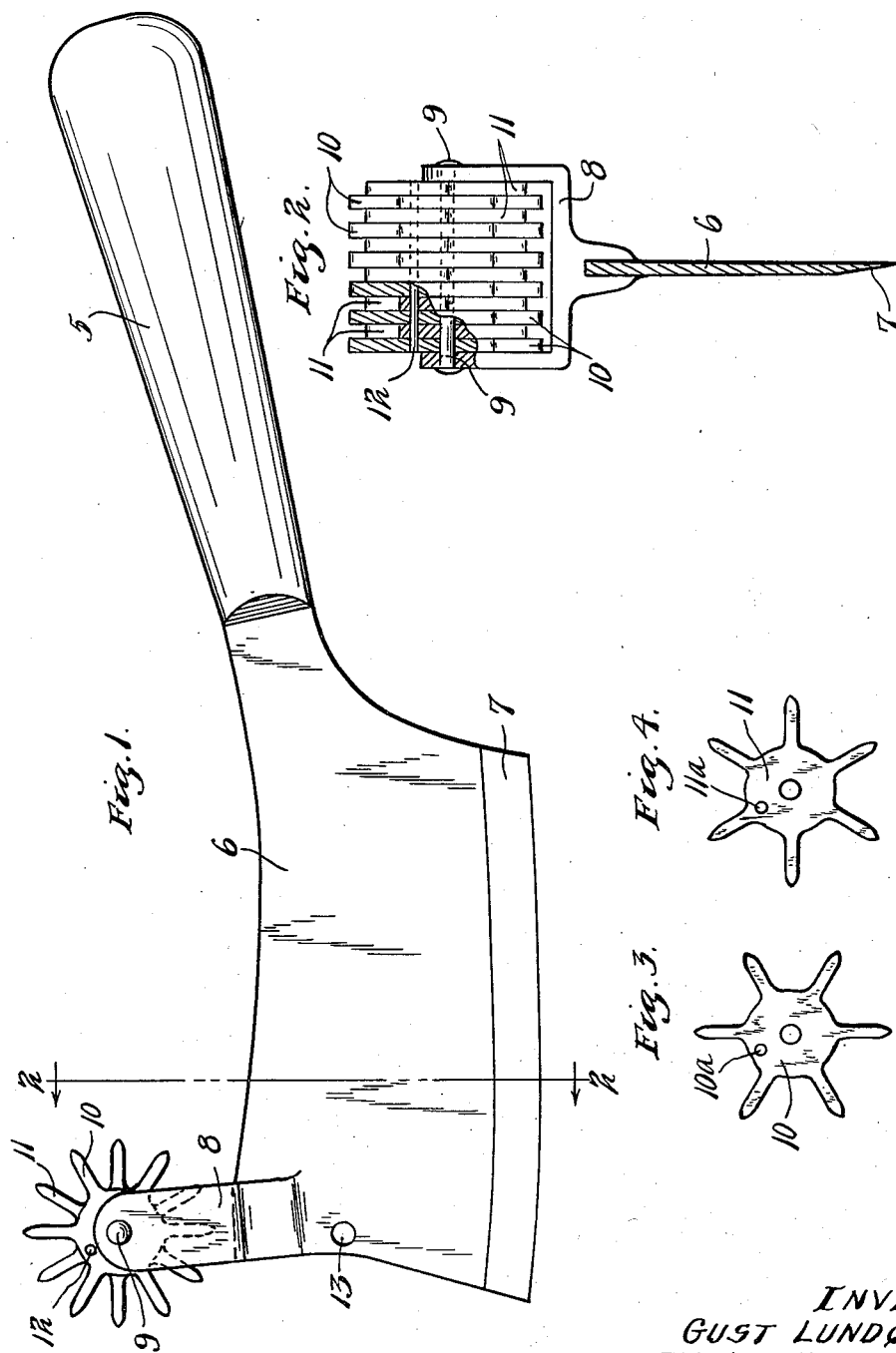
INVENTOR.
GUST LUNDQUIST.
BY HIS ATTORNEYS.
Williamson & Williamson Patented Oct. 19, 1937

2,096,120

UNITED STATES PATENT OFFICE 2,096,120

MEAT TENDERER

Gust Lundquist, Hopkins, Minn.

Application February 26, 1934, Serial No. 712,919

1 Claim. (Cl. 17—31)

This invention relates to what may be termed meat tenderers.

It is the general object of this invention to provide a novel device of cheap and simple construction, which can be used in cutting and pounding the muscular tissues and tendons of certain types of meat to make the same more tender.

More specifically, it is an object of the invention to provide a device which can be run over meat to puncture the surfaces of the same at numerous points and cut the muscular fibers found therein.

Another object is to provide a device for pounding meat, which will puncture the surfaces of the same to make the meat more tender as it is pounded.

The objects and advantages of the present invention will more fully appear from the following description, made in connection with the accompanying drawing, wherein like reference characters refer to the same or similar parts throughout the various views and in which, Fig. 1 is a view in side elevation illustrating an embodiment of the invention;

Fig. 2 is a vertical section taken on the line 2—2 of Fig. 1 as indicated by the arrows, certain of the parts being broken away to more clearly show the construction thereof; and Figs. 3 and 4 are respectively views in side elevation of different pronged disks that are used.

Referring to the drawing, there is provided in accordance with the present invention, a cleaver having a handle 5 and a heavy blade 6 provided with a sharpened edge 7.

Formed integral with the blade 6 of the cleaver and projecting upwardly therefrom, as viewed in Fig. 1, at the forward end of the blade from the non-sharpened edge of the same, is a U-shaped bracket 8, the two arms of which run upwardly from the blade in spaced parallel relation. A pivot 9 is mounted in the upper ends of the two arms and extends between the same. Rotatably mounted on this pivot 9 between the two arms of the bracket 8 are a plurality of radially pronged disks 10 and 11, these disks being alternated. Each of the disks 10 and 11 includes a central circular portion from which heavy radial prongs extend at regular circumferentially spaced points. These prongs terminate at their outer ends in sharpened wedge-shaped blades, having a width corresponding to the thickness of the disks. In the illustrated embodiment, each disk is provided with six prongs. The prongs of the disks 11 are circumferentially spaced midway between the prongs of the disks 10 when the device is viewed as shown in Fig. 1. To hold the various disks together and prevent relative rotation between the different disks as well as to permit the disks to be assembled on the pivot 9 with ease during construction of the device, there is provided a pin 12 which extends through openings 10a and 11a in the respective disks. These openings 10a and 11a are eccentric relative to the openings in the disks receiving the pivot 9 and the openings 10a in the disks 10 are disposed midway between a pair of prongs, while the openings 11a in the disks 11 are disposed in radial alinement with one of the prongs.

In using the device, a piece of tough meat such for example as round steak, or the like, may be laid on a table, whereupon the handle 5 may be grasped and the disks may be rapidly run over the meat, the cleaver being pressed firmly against the meat. The prongs on the disks 10 and 11 will penetrate into the meat, so as to puncture the surfaces thereof and the sharpened wedge-shaped ends of the prongs will sever the muscles and other tissues in the meat. The heavy blade 6 serves to cause the prongs to penetrate deeply into the meat and it also acts as a weight permitting the meat to be hammered, if this is desirable. In other words, the cleaver can be swung so that the prongs of the disks 10 and 11 will penetrate deeply into the meat and the dead weight of the blade 6 will cause a thorough penetrating action. Of course, the sharpened edge 7 of the cleaver can be used in the usual manner.

There is preferably provided an opening 13 through the blade 6 near its forward end in order to permit the device to be hung as from a nail or peg.

With the present invention, the toughest meats can be made tender and juicy with but slight effort and in a remarkably short time. The device of the invention has been successfully demonstrated in actual practice.

It will, of course, be understood that various changes may be made in the form, details, arrangement and proportions of the various parts without departing from the scope of the present invention, which generally stated, consists in the matter shown and described and set forth in the appended claim.

What is claimed is:—

In a combined manually operated cleaver and meat tenderer wherein the cleaver has a handle lying substantially in the same plane therewith, a supporting bracket integrally formed from the material of the cleaver and extending from the forward end and upper edge of the cleaver proper upwardly, said support comprising a pair of spaced arms between which a series of pronged wheels axially aligned are mounted constituting the tenderer, the forward edge of said support being in alignment with the forward edge of the cleaver whereby the tenderer may be manipulated with facility when the cleaver is held with the forward edge thereof substantially in contact with the surface of the meat to be tendered or whereby the cleaver may be reciprocated and simultaneously actuate the tenderer when the handle end thereof is moved substantially parallel to the meat surface.

GUST LUNDQUIST.